(12) United States Patent
Nuyujukian et al.

(10) Patent No.: US 9,373,088 B2
(45) Date of Patent: Jun. 21, 2016

(54) BRAIN MACHINE INTERFACE UTILIZING A DISCRETE ACTION STATE DECODER IN PARALLEL WITH A CONTINUOUS DECODER FOR A NEURAL PROSTHETIC DEVICE

(71) Applicant: The Board of Trustees of the Leland Stanford Junior University, Palo Alto, CA (US)

(72) Inventors: Paul Nuyujukian, Stanford, CA (US); Jonathan C. Kao, Stanford, CA (US); Krishna V Shenoy, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/025,100

(22) Filed: Sep. 12, 2013

(65) Prior Publication Data

US 2014/0081454 A1 Mar. 20, 2014

Related U.S. Application Data

(60) Provisional application No. 61/701,974, filed on Sep. 17, 2012.

(51) Int. Cl.
*G06N 3/02* (2006.01)
*G06N 99/00* (2010.01)
*G06N 3/00* (2006.01)

(52) U.S. Cl.
CPC ............... *G06N 99/005* (2013.01); *G06N 3/00* (2013.01); *Y10S 901/03* (2013.01); *Y10S 901/27* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,058,445 B2* | 6/2006 | Kemere | ............... | A61B 5/0476 600/544 |
| 7,813,544 B2* | 10/2010 | Fukaya | ............. | G06K 9/00248 382/118 |
| 7,826,894 B2* | 11/2010 | Musallam | ................. | A61F 2/68 600/378 |
| 8,175,686 B2* | 5/2012 | Utsugi | .................... | G06F 3/011 600/310 |
| 8,433,663 B2* | 4/2013 | Rickert | ............. | G06K 9/00536 623/24 |
| 8,812,096 B2* | 8/2014 | Flaherty | .................... | A61F 2/50 600/544 |
| 8,864,846 B2* | 10/2014 | Herr | ......................... | A61F 2/66 623/25 |
| 8,868,174 B2* | 10/2014 | Sato | ..................... | A61B 5/0476 600/473 |

(Continued)

OTHER PUBLICATIONS

Kim et al. (2011) Point-and-click cursor control with an intracortical neural interface system by humans with tetraplegia, IEEE Trans Neural Sys Rehabil Eng., Apr. 2011; 19(2): 193-203.

*Primary Examiner* — Jonathan L Sample
(74) *Attorney, Agent, or Firm* — Lumen Patent Firm

(57) ABSTRACT

A brain machine interface for control of prosthetic devices is provided. In its control, the interface utilizes parallel control of a continuous decoder and a discrete action state decoder. In the discrete decoding, we not only learn states affiliated with the task, but also states related to the velocity of the prosthetic device and the engagement of the user. Moreover, we not only learn the distributions of the neural signals in these states, but we also learn the interactions/transitions between the states, which is crucial to enabling a relatively higher level of performance of the prosthetic device. Embodiments according to this parallel control system enable us to reliably decode not just task-related states, but any "discrete action state," in parallel with a neural prosthetic "continuous decoder," to achieve new state-of-the-art levels of performance in brain-machine interfaces.

1 Claim, 6 Drawing Sheets

(56) References Cited

U.S. PATENT DOCUMENTS

| | | | | |
|---|---|---|---|---|
| 9,050,200 B2* | 6/2015 | Digiovanna | | A61F 2/68 |
| 2002/0198604 A1* | 12/2002 | Schulman | | A61B 5/07 623/25 |
| 2003/0023319 A1* | 1/2003 | Andersen | | A61F 2/68 623/24 |
| 2004/0073414 A1* | 4/2004 | Bienenstock | | G06F 3/015 703/2 |
| 2005/0159668 A1* | 7/2005 | Kemere | | A61B 5/0476 600/544 |
| 2005/0228515 A1* | 10/2005 | Musallam | | A61F 2/68 700/83 |
| 2005/0267597 A1* | 12/2005 | Flaherty | | A61B 5/0031 623/24 |
| 2006/0049957 A1* | 3/2006 | Surgenor | | G09B 21/00 340/4.1 |
| 2006/0167530 A1* | 7/2006 | Flaherty | | A61B 5/04001 607/62 |
| 2006/0173259 A1* | 8/2006 | Flaherty | | A61B 5/0031 600/331 |
| 2006/0241356 A1* | 10/2006 | Flaherty | | A61B 5/04 600/301 |
| 2006/0241788 A1* | 10/2006 | Srinivasan | | B25J 9/1694 700/56 |
| 2008/0055133 A1* | 3/2008 | Chakrabartty | | H03M 3/466 341/143 |
| 2008/0112885 A1* | 5/2008 | Okunev | | A61B 1/00016 424/9.1 |
| 2008/0177196 A1* | 7/2008 | Burdick | | A61B 5/04001 600/544 |
| 2010/0137734 A1* | 6/2010 | Digiovanna | | A61F 2/68 600/545 |
| 2011/0218453 A1* | 9/2011 | Hirata | | A61B 5/7267 600/544 |
| 2011/0307079 A1* | 12/2011 | Oweiss | | A61B 5/048 623/27 |
| 2012/0078381 A1* | 3/2012 | Vinjamuri | | A61B 5/04001 623/25 |
| 2013/0165812 A1* | 6/2013 | Aksenova | | A61F 2/72 600/544 |
| 2015/0245928 A1* | 9/2015 | Kao | | G06F 3/015 700/90 |

* cited by examiner

BRAIN MACHINE INTERFACE UTILIZING A DISCRETE ACTION STATE DECODER IN PARALLEL WITH A CONTINUOUS DECODER FOR A NEURAL PROSTHETIC DEVICE

CROSS-REFERENCE TO RELATED APPLICATIONS

This application claims priority from U.S. Provisional Patent Application 61/701,974 filed Sep. 17, 2012, which is incorporated herein by reference.

STATEMENT OF GOVERNMENT SPONSORED SUPPORT

This invention was made with Government support under contract N66001-10-C-2010 awarded by the Defense Advanced Research Projects Agency, under contract 1147470 awarded by the National Science Foundation and under contracts HD075623 and NS054283 awarded by the National Institutes of Health. The Government has certain rights in this invention.

FIELD OF THE INVENTION

The invention relates generally to neural prosthetics. In particular, the invention relates to brain machine interfaces.

BACKGROUND OF THE INVENTION

Neural prosthetics use neural signals to restore lost motor function to patients who suffer from motor neurological injury or disease. Work has been done to develop so-called "continuous decoders," which use neural signals to estimate the kinematics of a neural prosthetic device. However, decoding fundamentally different "discrete action state" signals could be crucial to enable higher performing, clinically relevant neural prosthetics. For example, when using a computer cursor, its utility is vastly limited if it is only capable of moving around on the screen. Instead, the cursor must also has to be able to make selections, i.e. "clicking," to be practically useful. Analogously, when controlling a robotic arm and hand, the utility of the device would be greatly enabled by allowing the hand to "grasp" objects, or adopt other typical hand configurations. The present invention addresses the need for decoding discrete action states based on neural signals for the control of prosthetic devices.

SUMMARY OF THE INVENTION

The present invention provides a method and a system for controlling a prosthetic device, which could either be a simulated device on a computer or a robotic device. A brain machine interface controls the prosthetic device using neural brain signals obtained from the motor cortex. The brain machine interface in its control executes in parallel a continuous decoder and a discrete action state decoder. The continuous decoder controls the kinematics of the prosthetic device based on the neural brain signals as input to the continuous decoder. The discrete action state decoder controls discrete action states of the prosthetic device based on the neural brain signals as input to the discrete action state decoder. The discrete action states distinguish three different types of states: (i) discrete velocity states of the prosthetic device, (ii) discrete idle states, and (iii) discrete task states of the prosthetic device. The discrete action state decoder is based on learning models in either an unsupervised or supervised fashion. The learning pertains to:

(j) learning distribution models of neural data for each of the states (i), (ii) and (iii), and (jj) learning probability transition (or interaction) models between the discrete states (i), (ii) and (iii).

In the learning of (j), we learn a plurality of distribution models since each decodable state has its own distribution. For example, in (iii) the discrete task states of the prosthetic device might entail whether the prosthetic device is "moving" or "stopping". If the discrete task states were "moving" and "stopping," we would measure a distribution of the neural data when the prosthetic device is "moving," and a distribution of the neural data when the prosthetic device is "stopping." Therefore, there would be two distributions in this context.

The learning models are statistical models developed based off the collected/observed neural data from prior training sessions.

A part of the present innovation to neural prosthetics is in defining various discrete action states (i), (ii), and (iii), and in modeling their interactions (jj). Combined with the learning of the distributions of the neural models, (j), the decoding of the discrete action states can become very reliable. This has the advantage to vastly augment the performance of a neural prosthetic device.

DETAILED DESCRIPTION

Figure 1:
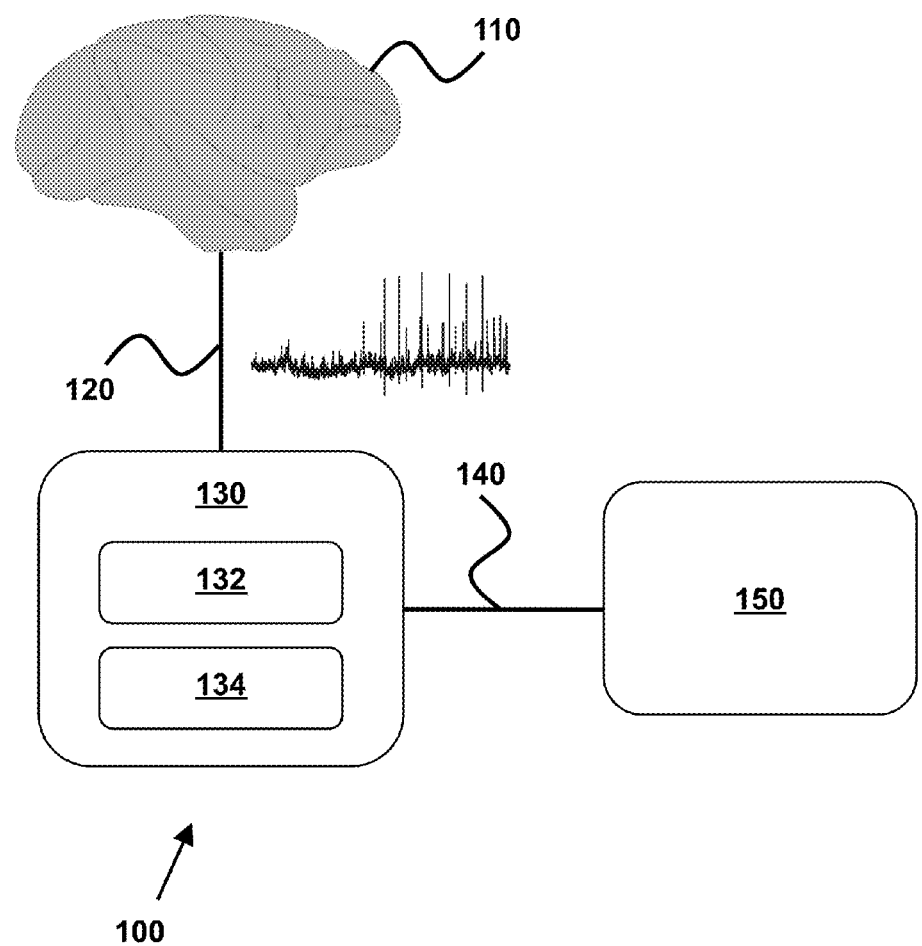
FIG. 1 shows a general overview of the method and system 100 according to an exemplary embodiment of the invention with a brain 110, brain signals 120 (e.g. based off threshold crossings from intracortical multielectrode arrays implanted in the motor cortex), a brain machine interface 130 (including a continuous decoder 132 and a discrete state controller 134) and a prosthetic device 150 that is controlled using control signals 140. The device could e.g. be a prosthetic device or a mouse on a computer screen).

Brain-machine interfaces (BMIs) 130 translate neural information (brain signals 120) into useful control signals (FIG. 1). They aim to guide electronic systems such as computer cursors and robotic prosthetic limbs. For continuously controlled systems, one of two methods has been employed to signal a stop or selection. One method is to hover for a specified time over the desired target. An alternate approach is to predict the intended state and transmit a "click" signal, which can speed up selection rate.

In this invention, we advance brain machine interfaces 130 by having a continuous control system or decoder 132 in parallel with a discrete action control system or decoder 134. An example of a continuous decoder that could be used was described in U.S. application Ser. No. 12/932,070 filed Feb.

17, 2011 which is an invention by the same group as the present invention. However, this invention is not limited to only that particular continuous decoders since other continuous decoders could also be used in parallel with the discrete decoder described in this invention.

In the discrete decoding, we not only learn states affiliated with the task, but also states related to the velocity of the prosthetic device and the engagement of the user (referred to as idle states). Moreover, we not only learn the distributions of the neural signals in these states, but we also learn the interactions/transitions between the states, which is crucial to enabling a relatively higher level of performance of the prosthetic device. Embodiments according to this parallel control system enable us to reliably decode not just task-related states, but any "discrete action state," in parallel with a neural prosthetic "continuous decoder," to achieve new state-of-the-art levels of performance in brain-machine interfaces. The following describes the discrete action state decoder.

In other words, in this invention, we have a discrete action state decoder which includes three different types of states: discrete velocity states of the prosthetic device (e.g. move slow or move fast), discrete idle states (e.g. stop or go), and discrete task states of the prosthetic device (e.g. grab or release, or move or click).

Discrete Decoder

Figure 2:
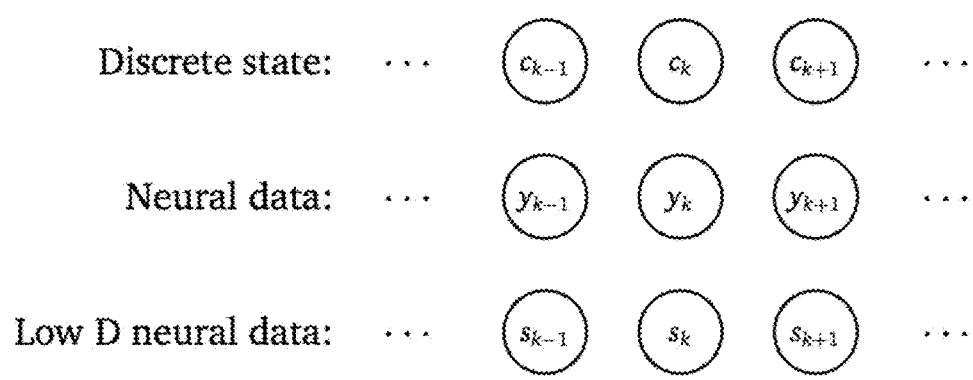
FIG. 2 shows a graphical model convention according to an exemplary embodiment of the invention.
Figure 3:
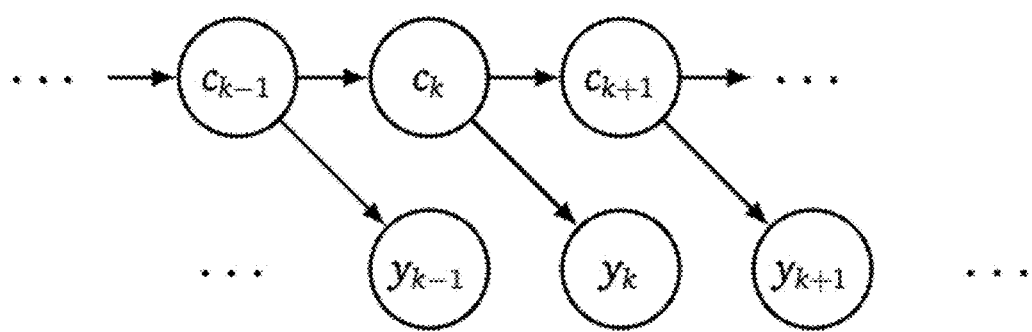
FIG. 3 shows a hidden Markov model according to an exemplary embodiment of the invention.

FIG. 2 shows graphical terminology for discrete action states states, neural data and low dimensional (D) neural data used herein. Referring to FIG. 3, let $c_k \in C$. For example, $C=\{move, stop\}$.

A transition model:

$$A_{ij} = Pr\{c_{k+1}=i | c_k=j\}$$

A Gaussian emissions process:

$$y_k | c_k = j \sim \mathcal{N}(\mu_j, \Sigma_j)$$

Figure 4:
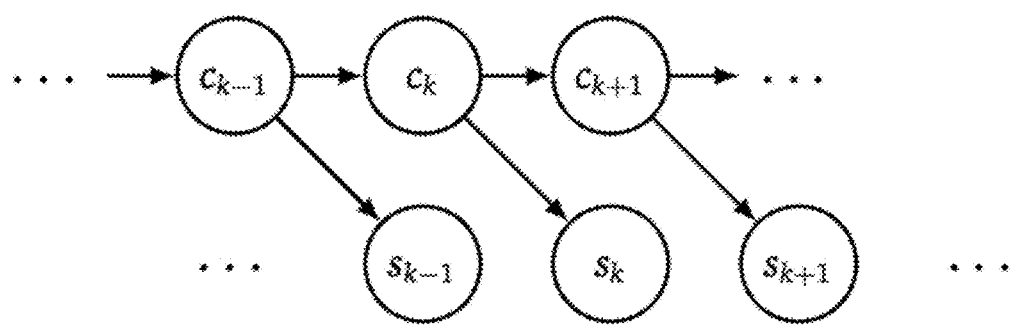
FIG. 4 shows decoding of low dimensional projections according to an exemplary embodiment of the invention.

FIG. 4, pertains to the decoding low dimensional projections. For example, move versus stop is a large variance event and such information should be contained in the top principal components of the neural data. Hence, we are able to decode off of the top principal components. This has a de-noising effect on the data, since if the data is low dimensional, principal component analysis is known to capture much of the signal variance in the top principal component dimensions, while much of the noise variance is captured in unused principal component dimensions. We are even able to decode discrete action states by using the first principal component alone.

This graphical model also represents how probabilities are calculated in a real time decode. From the graph, the goal is to determine $\forall c \in C$:

$$Pr\{c_k=c | c_{k-1}, s_k\}$$

and use a heuristic for the decoded state based on these probabilities. These probabilities are calculated by exploiting the Markovian structure of the graph (e.g. "belief propagation," can be used to calculate these probabilities). After calculating the probabilities, the decoded discrete action state is based on a heuristic. An example heuristic to decide the decoded discrete action state is:

$$c^* = \mathrm{argmax}_{c \in C} Pr\{c_k=c | c_{k-1}, s_k\})$$

Figure 5:
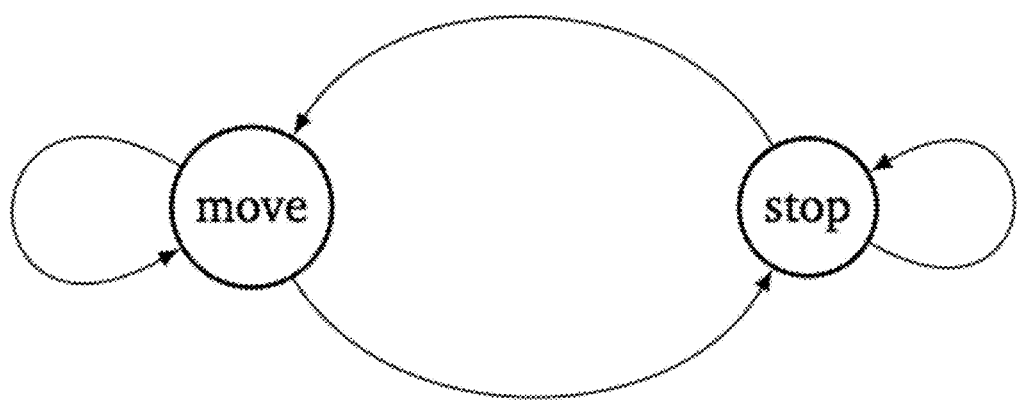
FIG. 5 shows state diagram of a probability transition model between two discrete states according to an exemplary embodiment of the invention.

FIG. 5 shows an example of a state diagram of the discrete decoder for a move versus stop task. In this example, each link (or arrow) denotes a probability of transition from one state to the other. Additionally, we learn the distribution of the neural data in each state ("move" and "stop" in the figure). When we train the model in a supervised fashion, we tag the neural data as "move" or "stop". Then, the transition model is the proportion of each observed transition. The distributions of the neural data in each state is then described by the sufficient statistics of the model distribution (e.g. in a Gaussian case, we would learn the mean and covariance of the tagged data for each state). If the training is unsupervised, the algorithm learns the underlying states, transition matrix and emission process.

In a specific example to learn the parameter of the transition model or the Gaussian emissions process, a supervised learning could be performed. For example, if $C=\{move, stop\}$ then we look for instances where the subject was moving the cursor (move), or holding the cursor in a fixed position (stop). To learn the transition model, $A_{ij}$, we then label the discrete state at each time point k, $c_k$, as being in state i, j, etc. and calculate the empirical distribution of transitions $i \to i$, $i \to j$, $j \to j$, $j \to i$, etc. To learn a Gaussian emissions process distribution in state j, which are $\mu_j$, $\rho_j$, we calculate the sample mean and sample covariance of the neural state projections ($s_k$) observed when in state j.

Figure 6:
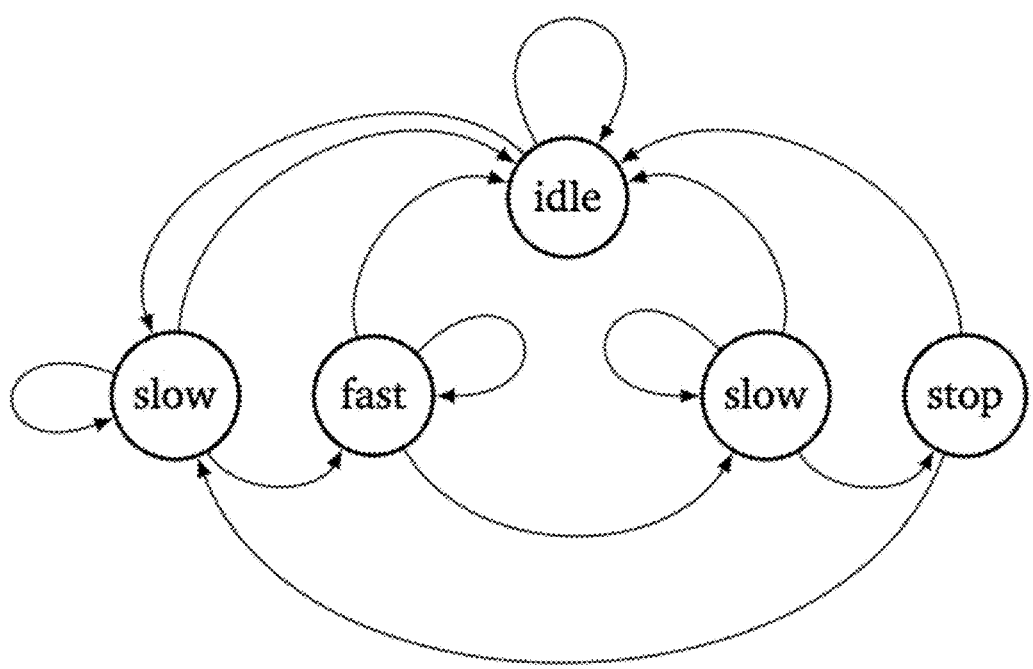
FIG. 6 shows other discrete complex state models according to an exemplary embodiment of the invention.

Based on the same principles described herein more complex state models can be derived with different states (see FIG. 6). For example, an "idle" state can be decoded, a "move slow" state and a "move fast" state can be decoded. A person skilled in the art would readily appreciate the decoding of other velocity states, task states and idle states based on the methods presented herein. Having a variety of states is also useful in discriminating intent. For example, when decoding that the subject is idling, and does not want to do the task, we can effectively "turn off" the task.

Embodiments of the invention can be varied by varying the number of states allowed and the representation of the states, as long as such states are captured by the neural data. The continuous and discrete controller, though in parallel, could be used to also affect each other. For example, if we detect a "slow" move discrete state, we can change the continuous decoder to be a more precise controller. We could also vary the emissions process statistical distribution; in our example, we learned the sufficient statistics of a Gaussian distribution, but the distribution could be different (for example, a Poisson distribution). We could further vary the way the disrete decoder is trained (e.g. unsupervised versus supervised).

Embodiments of the invention could be implemented as a method, computer-implemented method, a chip or controller unit executing method steps, or as a system.

What is claimed is:

1. Method of controlling a prosthetic device, comprising:
a brain machine interface for controlling said prosthetic device based on neural brain signals, wherein said brain machine interface in said control executes in parallel a continuous decoder and a discrete action state decoder,
wherein said continuous decoder controls kinematics of said prosthetic device based on said neural brain signals as input to said continuous decoder,
wherein for said discrete action state decoder the neural brain signals are initially projected into a neural space of lower dimensionality compared to the dimensionality of the neural brain signals,
wherein said discrete action state decoder controls discrete action states of said prosthetic device based on said projected neural brain signals as input to said discrete action state decoder, wherein said discrete action states comprise:
(i) discrete velocity states of said prosthetic device,
(ii) discrete idle states; and
(iii) discrete task states of said prosthetic device, wherein said discrete action state decoder is based on learning models, wherein said learning comprises:
(j) learning distribution models of neural data for each of said states (i), (ii) and (iii); and
(jj) learning probability transition models between said states (i), (ii) and (iii) wherein the likelihood of said discrete action states is decoded and propagated through time.

\* \* \* \* \*